US006784229B2

(12) United States Patent
Rooshenas

(10) Patent No.: US 6,784,229 B2
(45) Date of Patent: Aug. 31, 2004

(54) CEMENT-BASED THIN-SET MORTAR

(75) Inventor: Rezvan Rooshenas, Hamden, CT (US)

(73) Assignee: LATICRETE International, Inc., Bethany, CT (US)

(*) Notice: Subject to any disclaimer, the term of this patent is extended or adjusted under 35 U.S.C. 154(b) by 0 days.

(21) Appl. No.: 10/229,458

(22) Filed: Aug. 27, 2002

(65) Prior Publication Data

US 2004/0044103 A1 Mar. 4, 2004

(51) Int. Cl.$^7$ .............................................. C04B 24/28
(52) U.S. Cl. .................................... 524/5; 525/4
(58) Field of Search ....................................... 524/4–5

(56) References Cited

U.S. PATENT DOCUMENTS

| | | | |
|---|---|---|---|
| 3,301,799 A | 1/1967 | Rothberg et al. ............... 524/5 |
| 3,865,779 A | 2/1975 | Oya et al. ....................... 524/7 |
| 4,021,257 A | 5/1977 | Bernett ........................ 126/90 |
| 4,065,319 A | 12/1977 | Desmarais ................... 126/93 |
| 4,146,402 A | 3/1979 | Kira et al. .................. 106/109 |
| 4,218,258 A | 8/1980 | Rothberg ..................... 106/93 |
| 4,402,752 A | 9/1983 | Chesney, Jr. ................. 106/93 |
| 4,414,030 A | 11/1983 | Restrepo ..................... 106/90 |
| 4,428,775 A | 1/1984 | Johnson et al. ............... 106/90 |
| 4,501,617 A | 2/1985 | Desmarais ................... 106/43 |
| 4,515,636 A | 5/1985 | Carney et al. ................ 106/90 |
| 4,528,238 A * | 7/1985 | Alford ........................ 442/256 |
| 4,565,840 A | 1/1986 | Kobayashi et al. ............. 524/8 |
| 4,693,749 A | 9/1987 | Gale ........................... 106/99 |
| 4,883,535 A * | 11/1989 | Hamaguchi et al. ........... 524/5 |
| 4,902,347 A | 2/1990 | Soroushian et al. .......... 106/99 |
| 4,902,348 A * | 2/1990 | Kossatz et al. ............. 106/780 |
| 4,974,522 A * | 12/1990 | Holden et al. ................. 524/5 |
| 5,084,103 A | 1/1992 | Myers et al. ................ 106/727 |
| 5,224,595 A | 7/1993 | Sugimoto et al. ........... 106/823 |
| 5,234,754 A * | 8/1993 | Bache ........................ 428/332 |
| 5,262,243 A | 11/1993 | Gevorgian ................... 428/457 |
| 5,298,071 A | 3/1994 | Vondran ..................... 106/757 |
| 5,308,397 A | 5/1994 | Whatcott .................... 106/711 |
| 5,362,320 A | 11/1994 | Whatcott .................... 106/709 |
| 5,383,314 A | 1/1995 | Rothberg ..................... 52/408 |
| 5,393,343 A | 2/1995 | Darwin et al. .............. 106/808 |
| 5,399,195 A | 3/1995 | Hansen et al. .............. 106/711 |
| 5,456,752 A | 10/1995 | Hogan ........................ 106/802 |
| 5,509,961 A | 4/1996 | Cilia ........................... 106/675 |
| 5,543,186 A * | 8/1996 | Andersen et al. ........... 428/34.4 |
| 5,580,378 A | 12/1996 | Shulman ..................... 106/677 |
| 5,628,822 A | 5/1997 | Hogan ........................ 106/802 |
| 5,665,154 A | 9/1997 | Modrak ...................... 106/232 |
| 5,718,757 A | 2/1998 | Guillou et al. .............. 106/641 |
| 5,725,652 A | 3/1998 | Shulman ..................... 106/677 |
| 5,753,368 A | 5/1998 | Berke et al. ................. 428/375 |
| 5,788,760 A | 8/1998 | Li et al. ..................... 106/644 |
| 5,814,146 A | 9/1998 | Maggio et al. .............. 106/802 |
| 5,925,449 A | 7/1999 | Davidovits ................ 428/297.4 |
| 5,993,537 A | 11/1999 | Trottier et al. .............. 106/724 |
| 6,010,786 A | 1/2000 | Takai ......................... 428/364 |
| 6,060,163 A | 5/2000 | Naaman ...................... 428/397 |
| 6,099,638 A | 8/2000 | Garcia ........................ 106/724 |
| 6,167,668 B1 | 1/2001 | Fine et al. ................... 52/404 |
| 6,177,195 B1 | 1/2001 | Yabuki et al. .............. 428/399 |
| 6,197,423 B1 | 3/2001 | Rieder et al. ............... 428/397 |
| 6,250,043 B1 | 6/2001 | Dieckmann et al. ......... 52/341 |
| 6,569,924 B2 * | 5/2003 | Shendy et al. ................. 524/5 |

FOREIGN PATENT DOCUMENTS

| | | |
|---|---|---|
| CA | 1127673 | 7/1982 |
| JP | 53-138422 | * 12/1978 |

OTHER PUBLICATIONS

*Specialty Additives for Enhanced Performance*, KEVLAR® and NOMEX®, Copyright 1998, E. I. duPont de Nemours and Company, 10/98.

KEVLAR® *Brand Pulp in Adhesives, Sealants, Coatings and Fiber–Reinforced Plastics*, Copyright 1999, E. I. duPont de Nemours and Company, 3/99.

*High Strength Shock and Weather Resistant Ceramic Tile and Stone Installation Systems*, pp. 1–22, Laticrete Product Selection Catalog D.S. 221.0, Copyright 1999 Laticrete International, Inc., Rev. 4/99.

*Properties of Aramid–Fiber Reinforced Concrete and Sifcon$^a$*, by Antonio Nanni, pp. vi, and 1–15, Journal of Materials in Civil Engineering, vol. 4, No. 1, Feb. 1992.

Vermiculite, Vermiculite Home Page for Information about Vermiculite—A Mineral with Many Uses, http://www.vermiculate.net/, Sep. 4, 2001, pp. 1–5.

*Mechanical Properties of Various Types of Fibre Reinforced Concretes*, by Hiroaki Nakagawa, Shigeyuki Akiham and Tatsuo Suenaga, Kajima Institute of Construction Technology, 2–19–1 Tobitakyu, Chofu City, Tokyo 182, Japan, pp. 523–532.

* cited by examiner

*Primary Examiner*—Peter Szekely
(74) *Attorney, Agent, or Firm*—DeLio & Peterson, LLC; John J. Tomaszewski

(57) ABSTRACT

A cement mortar is provided which is mixed with a liquid media, preferably either water or aqueous latex, for use as a thin-set mortar, medium bed mortar, underlayment mortar and/or grout (pointing mortar). The mortar or grout contains cement, sand and a water retaining agent and is improved by employing an aramid fiber in the mortar. A p-aramid fiber is preferred and it is highly preferred to use the polymer fiber in a pulp form which has a fibrillated structure. The overall performance properties of a cement-based mortar or grout such as a thin-set mortar are significantly improved including sag resistance, open time, bond strength, flexibility, heat aging and water immersion strength.

33 Claims, No Drawings

CEMENT-BASED THIN-SET MORTAR

BACKGROUND OF THE INVENTION

1. Field of the Invention

The present invention relates to cement-based mortars and grouts for installing tile, stone and other masonry products over surfaces including concrete, masonry, brick and plywood, and, in particular, to thin-set mortars, medium bed mortars, and underlayments (leveling mortars) and grouts (pointing mortars) having enhanced overall performance properties including sag resistance, high tensile bond and shear bond strength, long open time, flexibility, water immersion strength, heat aging and freeze and thaw resistance.

2. Description of Related Art

Tiles, particularly ceramic tiles and stone, are predominantly installed using thin-bed (or thin-set) mortars because significantly thinner and lighter applications of mortar, typically and approximately 1/8" (3 mm) to 1/2" (12 mm) can be made to set the tile.

Traditionally, tile has been installed over a substrate with a Portland cement mortar bed approximately 2" (50 mm) thick to ensure sufficient moisture is present to properly hydrate the cement content and develop strength. Also referred to as the 'conventional method' or the 'mud method', this installation technique generally requires a separate, thin 'bond coat' or 'slurry bond coat' be applied between the tile and the surface of the thick bed mortar to provide proper adhesion. In addition, if not bonded to the underlying surface, the thick bed mortar also needs galvanized, welded steel reinforcing wire placed at its mid-point to provide tensile and flexural resistance to structural deflection. These factors make the thick bed method heavier, more material intensive, more laborious, slower and needing higher skill levels. For these reasons, thick bed installations have increasingly been replaced by thin-set and medium bed mortars that incorporate various Portland cement modifiers to improve physical performance and to allow bonding of tile to substrates with far less material.

For convenience, the following description will be directed to thin-set mortars but it will be understood to those skilled in the art that the invention also applies to mortars in general and in particular cementitious medium bed mortars, which are applied in a similar manner but at greater depth to accommodate more uneven substrates and/or tile thickness variations, and underlayments (or leveling mortars) as well as cement grouts and pointing mortars, which are used to fill the spaces between the set tiles. The term "tile" will be used herein to refer to other masonry products such as stone, bricks, pavers, and the like and the term "mortar" will be used herein to refer to thin-set mortars, medium bed mortars, underlayment or leveling mortars and grouts and pointing mortars.

Currently, most cement-based thin-set mortars, medium bed mortars, underlayments and grouts and pointing mortars contain cement, such as Portland or calcium aluminate cement, a water retention aid and sand. In addition, so called 'multi-purpose' or 'polymer modified' mortars and grouts contain spray dried polymers that enhance physical properties, such as compressive strength, or, in the case of mortars, the ability to bond to non-masonry substrates such as exterior grade plywood.

The thin-set mortars, medium bed mortars, underlayments and grouts and pointing mortars are typically delivered to the job site in dry powder form and water or a liquid polymer such as latex is then added while mixing to produce a plastic, wet consistency. Thin-set and medium bed mortars are typically then trowelled over the substrate using a notched trowel, or similar tool, having dentations ranging in size from 3/16" (5 mm) to 3/4" (19 mm) depending on mortar and tile type. The tiles are then placed into the wet mortar, aligned with tiles already set or other reference marks and beaten in until level. Once the tiles are firmly set, the joints or spaces between them are filled with a grout mortar, typically cement-based, using a rubber float or similar device.

The above mortars and grouts for installing tile require a combination of performance properties to be commercially acceptable including high bond and shear bond strength, flexibility, water immersion strength, sag resistance, open time, heat aging and freeze and thaw resistance depending on type and application. Many mortars and grouts satisfy one or more of the above properties but it is highly desirable to provide mortar and grout products which has enhanced overall performance properties.

Sag resistance is particularly important, for mortars and grouts used for installing tile over vertical and inclined substrates. Preventing tiles from dropping down out of alignment after being placed, and reducing the slumping of grout in joints, have material effects on installation productivity, quality, profitability and, ultimately, on market acceptance. Moreover, high sag resistance in mortars is beneficial in horizontal applications involving heavy tiles, where it provides additional support against flooring units 'sinking' and causing the common installation defect known as 'lippage'. Finally, high sag resistance grouts also benefit horizontal installations in the instance where void spaces caused by inadequate bedding of tiles frequently produce 'sinkholes' in the finished grout application.

This invention is also useful in underlayments (or leveling mortars) whose primary, but not sole, functions are to prepare uneven substrates to receive tile installed by the thin or medium bed methods, to accommodate differences in tile thickness or stone 'gauge' and to improve the deflection resistance of certain substrates to a degree that permits proper support for the hard, more brittle tiles placed over them, thereby reducing the common problems of tile crazing, cracking and de-lamination. Moreover, the synergistic effects of combining the novel components of this invention produce an underlayment with superior flexural resistance, improved 'cohesive' (internal shear) strength, better workability and 'heal' time, reduced water demand and the ability to be 'placed' without subsequent slumping or shrinkage. In general, a cement based underlayment powder is mixed with water to a very fluid consistency (usually 1.5–1.75 gallon of water per 50 pound bag powder). The fluid mixture is poured or pumped on the floor and a rake used to distribute the underlayment evenly and a long handle flat trowel or squeegee used to make the surface even.

It is known to incorporate finely divided inorganic fibers, for example, mineral wool, glass wool, and asbestos in hydraulic cement-based thin-set mortars for improved sag resistance as discussed in U.S. Pat. No. 4,218,258 assigned to the assignee of the present invention. Latex is also disclosed as being useful for improving shear bonding and increasing the resistance to the effects of freeze-thaw cycles. U.S. Pat. No. 4,065,319 discloses the use of inorganic and organic fibers such as asbestos, mineral wool, glass fibers, fibrous low substitution or cross linked carboxymethyl cellulose and the like to increase the sag resistance. In U.S. Pat.

No. 4,402,752, it is disclosed to incorporate long-chain organic polymers such as anionic and nonionic long-chain polyacrylamide materials to improve sag resistance of the mortar. It is also noted therein that the use of clay has also been developed for use in mortars both alone and in combination with the long-chain organic polymers.

Mortars such as thin-set mortars, medium bed mortars, underlayments and grouts and pointing mortars, however, require more than sag resistance as noted above and it is a continuing goal of industry to provide such mortars having enhanced overall performance properties so that a single mortar product can be used in a variety of applications such as setting both vertical and horizontal tiles in interior as well as exterior applications.

Conventional cement-based mortars contain a cement, preferably Portland or calcium aluminate cement or other hydraulic cements, fillers such as sand, clay and calcium carbonate and a water retaining agent and sometimes a polymer to improve the sag resistance as noted above. Improving sag resistance however, usually reduces the open time of the mortar. Open time (or workability) is very important in order to obtain good bond strength and may be defined as the amount of time it takes before a dry surface or skin forms on the troweled mortar. A dry surface or skin surface can lead to poor bonding between the tile and the mortar bed. An increase in open time allows the user to spread a larger area of mortar with less chance of drying before laying the tile. Adding fiber to hydraulic cement-based mortars however generally detracts from workability and open time and in order to improve the workability and open time more water or liquid is required. Adding more liquid or water will typically make the cement base products more porous and weaker and generally reduces other performance properties of the mortar such as the bond strength, freeze and thaw properties, flexibility, and water immersion strength.

Bearing in mind the problems and deficiencies of the prior art, it is therefore an object of the present invention to provide an improved mortar such as cement-based thin-set mortar, medium bed mortar, underlayment and grout and pointing mortar compositions having enhanced overall performance properties.

It is another object of the present invention to provide a method for making an improved mortar such as a cement-based thin-set mortar, medium bed mortar, underlayment and grout and pointing mortar composition and a method for using the thin-set mortar, medium bed mortar, underlayment and grout and pointing mortar of the invention.

Still other objects and advantages of the invention will in part be obvious and will in part be apparent from the specification.

SUMMARY OF THE INVENTION

The above and other objects, which will be apparent to those skilled in art, are achieved in the present invention which relates in one aspect to an improved mortar and in particular a cement-based thin-set mortar comprising a cement, preferably a hydraulic cement such as Portland cement, and a water retaining agent, preferably a cellulose ether or an alkyl derivative of cellulose, with the improvement comprising employing in the mortar composition an effective amount of a poly (p-phenylene terephthalamide) polymer fiber ("p-aramid") and/or poly(m-phenylene terephthalamide) polymer ("m-aramid") to improve the overall performance properties of the mortar. A fibrillated p-aramid polymer is preferred.

In another aspect of the invention an improved medium bed mortar is provided with the improvement comprising employing in the mortar composition an effective amount of a poly (p-phenylene terephthalamide) polymer fiber ("p-aramid") and/or poly(m-phenylene terephthalamide) polymer ("m-aramid") to improve the overall performance properties of the mortar. A fibrillated p-aramid polymer is preferred.

In another aspect of the invention an improved underlayment (leveling mortar) is provided with the improvement comprising employing in the mortar composition an effective amount of a poly (p-phenylene terephthalamide) polymer fiber ("p-aramid") and/or poly(m-phenylene terephthalamide) polymer ("m-aramid") to improve the overall performance properties of the mortar. A fibrillated p-aramid polymer is preferred.

In another aspect of the invention a cement-based grout (or pointing mortar) is provided with the improvement comprising employing in the grout an effective amount of the above p-aramid and/or m-aramid fiber. A fibrillated p-aramid is likewise preferred. In general, a cement-based grout comprises cement, filler, cement accelerator, water retaining agent, defoamer and polymer.

When the mortar or agent is admixed with a liquid media, preferably water or an aqueous latex, to form a plastic and trowable wet mortar, the novel mortar of the invention can be utilized in thin and medium layers and as underlayment for setting tiles and also in grouts and pointing mortars to fill in the spaces between the set tiles.

The improved cement mortars are workable and easy to apply and are well-suited for thin-set, medium bed, underlayment and grouting applications and provide enhanced high tensile bonding and shear bonding strength, sag resistance, open time, flexibility, water immersion strength, heat aging and freeze and thaw resistance.

DESCRIPTION OF THE PREFERRED EMBODIMENT(S)

The cement-based thin-set mortar, medium bed mortar, underlayment and grout of this invention are useful for installing ceramic tiles, brick, ceramic mosaic, marble, quarry tile, slate, pavers or stone over surfaces including concrete, masonry, brick, gypsum wallboard, gypsum plastic, cement backer board or tile and stone. Depending on which liquid is mixed with the mortar, the mortar of the invention can be used on other surfaces such as asbestos, cement board, plywood, wood surfaces and slate board.

Any mortar and thin-set mortar of the prior art can be used in the practice of the invention to provide the enhanced mortar and thin-set mortar of the invention. The ingredients for the thin-set mortar composition generally include cement, preferably a hydraulic cement, a filler such as sand, and a water retaining agent such as an alkyl derivative of cellulose.

Typically, the cement-based thin-set mortars of the present invention are essentially dry mixtures comprising in weight %, about 20 to 99% cement, preferably 20 to 50%, and preferably hydraulic cement, about 0.1 to 4%, preferably 0.5 to 2.5% of a water retaining agent such as a cellulose ether or alkyl cellulose derivative, up to about 80%, e.g., 10 to 80%, typically 50 to 80% sand, 1 to 10% additives such as polymer, clay, etc. and about 0.01 to 1%, or more, of a p-aramid and/or m-aramid polymer fiber. A typical additive polymer is ethylene vinylacetate.

Typically, the cement-based medium bed mortars of the present invention are essentially dry mixtures comprising in weight %, about, 20–60% cement, 40–75% sand, 0–5% micro silica, 0–15% meta kaolin, 0–8% polymer, 0.1–1% water retaining agent, 0–2% dispersing agent, 0–10% calcium carbonate and 0.01–1%, or more, p-aramid and/or m-aramid polymer fiber.

Typically, the underlayments (or leveling mortars) of the present invention are essentially dry mixtures comprising in weight %, about, 5–20% cement, 10–30% calcium aluminate cement, 2–10% calcium sulfate, 40–75% calcium carbonate, 1–5% polymer, 0.1–1% plasticizer, 0.001–1% water retaining agent, 0.1–0.5% defoamer, 0.01–1% retarder, 0.01–1% accelerator and a 0.01–1%, or more, of a p-aramid and/or m-aramid polymer fiber.

Any cement or mixtures of cement can be utilized in the mortar and a hydraulic cement such as Portland cement or calcium aluminate cement is preferred. Similarly, any type of conventional filler material may be used in conjunction with the hydraulic cement and is preferably sand or limestone.

It is an important feature of the invention that a water retaining agent be used in the composition since this has been found to have a synergistic effect with the aramid fiber additive. The water retaining agent is preferably an alkyl derivative of cellulose, such as methyl cellulose, sodium carboxy methyl cellulose, hydroxymethyl, methyl cellulose, hydroxyethyl methyl cellulose, hydroxypropyl methyl cellulose and hydroxybutyl methyl cellulose. Other alkyl derivatives of cellulose, cellulose ethers, or other suitable water retaining aids, e.g., starch, clay and water absorbents, can advantageously be utilized in the thin-set mortars of the invention.

The water retaining agent, i.e., cellulose derivative, is typically used in a thin-set composition in an amount of about 0.1 to 4%, preferably 0.5 to 2 wt. % in the mortar mixture. The amount of derivative varies inversely with the viscosity of the particular derivative used with the higher viscosity derivatives used at the lower end of the range and a lower viscosity derivative used at the higher end of the range. The amount of derivative also varies proportionately to the amount of cement, with higher amounts of cement requiring higher amounts of the water retaining agent.

The novel mortars of the invention may also contain optional additives conventionally utilized in these type of compositions. These include, but are not limited to, conventional defoamers, coloring agents, odor masks such as perfumes, dry dispersing agents which improve flow and wetability of the dry material when admixed with aqueous media, polymers to enhance performance properties, cement accelerators such as calcium chloride and the like, wetting agents and accelerators such as calcium formate. It should be understood that for purposes of the present invention, any conventional additive for cement mortars may be optionally provided in the novel compositions of the invention.

This invention relates to improving cement-based thin-set mortars, medium bed mortars, underlayment and grouts and specifically to enhance the overall performance properties of the mortar such as bond and shear bond strength, flexibility, open time, heat resistance, freeze and thaw resistance, water immersion strength, and sag resistance. The dry mortar of the invention is mixed with water or latex and used for tile and stone installation or as a grout. Using PPD-T (para-phenylenediamine terephethalamide) fiber has demonstrated unexpected unique performance properties for cement based mortars such as improving the bond strength of tile to various substrates such as concrete, tile, plywood and stone. The bond strength has been improved under different conditions such as water immersion, freeze and thaw, and heat aging. Open time and sag resistance while typically interfering with each other, have also both been improved significantly. Adding the preferred p-aramid fiber to cement-based thin-set mortars has been found to enhance all the above performance properties.

KEVLAR® is made by DuPont and refers to a p-aramid fiber based on poly(p-phenylene) terephthalamide. KEVLAR is provided as a pulp product and as a cut fiber and it is highly preferred that the pulp product be used in the mortar of the invention because of its demonstrated effectiveness.

Fibers of KEVLAR consist of long molecular chains produced from poly (p-phenylene) terephethalamide which are highly oriented with strong interchain bonding. Fibers are available commercially in lengths from 4.5 mm to 0.5 inch. KEVLAR pulp consists of a main fiber surrounded by many smaller attached fibrils resulting in a high surface area product. The diameter of the pulp fiber is typically about 12 micron (base diameter) and the length about 0.2 to 0.5 mm.

It has been found that the incorporation of p-aramid pulp into a thin-set mortar composition provides superior enhanced overall performance properties to the conventional mortar. The p-aramid pulp is incorporated in the composition in an amount of about 0.01 to 1 wt. %, preferably 0.05 to 1 wt. % of the dry composition.

NOMEX® is also made by DuPont and refers to m-aramid fibers based on poly (m-phenylene) terephthalamide. NOMEX is also provided as a cut fiber and a fibrid. The cut fiber is available in lengths of about 0.0625 inch to 0.25 inch. This invention covers the use of NOMEX as well as the KEVLAR as discussed above. KEVLAR, and especially KEVLAR pulp, is preferred because of its demonstrated effectiveness.

The uniqueness of the present invention is that the aramid fibers will increase both open time and nonsag properties together as well as improving the overall performance properties of the invention. It is an important feature of the invention that adding the aramid fiber does not significantly increase the water demand of the mortar and a very smooth and creamy mortar texture which has good cohesiveness and tackiness is obtained.

The preferred p-aramid fiber is a short inert and highly fibrillated pulp with a length of about 0.05 to 1 mm, preferably 0.2 to 0.7 mm and most preferably 0.2 to 0.39 mm, and when a liquid is added and it is dispersed in the mortar, it opens to a three dimensional pulp which physically reinforces the mortar by providing a permanent internal three dimensional net in the mortar which increases the wet cohesiveness of the mortar and locks the mortar to where it is in contact. Since the p-aramid fiber is inert and has low water demand, it does not absorb any liquids and may be used in a very small amounts. The p-aramid fiber is dimensionally stable even at a very high temperature (350° C.) and it is hypothesized that the bond improvement at high temperature aging is related to this property of the p-aramid fiber. The pulp has a specific gravity of about 1.45, a specific surface area of $7-11 m^2/g$ and a bulk density of about 3–7 $lbs/ft^3$.

The thin-set mortar of the instant invention contains 0 to 80 part sand, 20 to 99 part cement, 0.01 to 1 part aramid fiber, 0.1 to 4 parts water retaining agent and about 1 to 10 parts additive, such as clay, calcium carbonate and polymer. A preferred composition contains 50 to 70 part sand, 30 to 50 part cement, 0.05 to 0.5 part aramid fiber, 0.5 to 2.5 part water retaining agent and 1 to 10 part additive. The mortar can be mixed with a latex to generally obtain the results obtained by adding a polymer to the dry mortar.

The hydraulic cement mortar compositions of the invention can be admixed with a suitable aqueous latex, instead of water, in order to provide a wet mixture or wet mortar which is particularly well suited and advantageously utilized in thin-set applications. Typically, the liquid is added to the dry mortar composition and mixed until a paste-like slurry is formed. Mixing usually takes 3 to 10 minutes and extra mixing will not impair the performance properties of the mortar.

While it is within the purview of the invention that any type of conventional aqueous latex can be utilized, it is preferable to use either styrene-butadiene rubber, Neoprene, natural latex, butyl latex, acrylic latex, polyvinyl acetate latex, vinylacetate copolymer, or mixtures thereof. Most preferably, styrene-butadiene rubber (SBR) containing about 10 to 45 wt. %, and preferably 20 to 40 wt. % solids and stabilized with nonionic and ionic surfactants is utilized for admixture with the novel cement mortar compositions of the invention. It is particularly advantageous for these compositions to utilize minor quantities of defoaming agents, as well as anti-fungicidal agents.

The mortar of the invention may be made by mixing the ingredients together in a blender to form a uniform mixture.

The improved grouts (pointing mortars) of the invention generally comprise a filler (such as sand), cement, cement accelerator, water retaining agent, defoamer, polymer and an effective amount of paramid and/or m-aramid fiber.

A typical grout (pointing mortar) composition contains, by weight %, 15 to 50% cement, 50 to 85% filler (preferably sand), 0.01 to 0.5% water retaining agent, 0 to 10% additives, 0 to 25% pigment, 0 to 5% polymer and 0.01–1, or more, preferably 0.1 to 0.5% aramid fiber, preferably p-aramid pulp.

Various embodiments of the present invention will now be illustrated by reference to the following specific examples. It is to be understood, however, that such examples are presented for purposes of illustration only, and the present invention is no way be deemed as limited thereby.

EXAMPLE 1

The following mortar was prepared. All ingredients in this example and the following examples are in weight % unless otherwise noted.

|  | Formula 1 |
| --- | --- |
| Sand | 60.4 |
| While cement | 34.33 |
| PPD-T fiber | 0.48 |
| Water retaining agent | 1.42 |
| Calcium carbonate | 3.40 |
| Calcium formate | 0.34 |

The water retaining agent is methyl hydroxy cellulose. The PPD-T fiber is KEVLAR pulp sold by DuPont.

Shear bond strength of the above formula has been improved whether it is mixed with water or latex. If mixed with water, 7 day shear bond is 304 psi. The same formula without the PPD-T fiber is 217 psi shear bond after 7 days. If mixed with latex, the above formula has a 491 psi shear bond and the same formula without PPD-T fiber has a 407 psi shear bond. The % increase is 40% and 20%, respectively. Shear bond strength is performed by placing the mortar between two (2) offset nonabsorbent tiles, and after a period of time, they are separated by a compressive force. Bond strength on the other hand is a tensile measurement.

Example 2 shows the of effect on performance of using p-aramid fiber versus a conventional nonsag additive.

EXAMPLE 2

|  | Comparative Formula 2A | Formula 2 |
| --- | --- | --- |
| Sand | 59.6 | 59.6 |
| Gray cement | 39.77 | 39.77 |
| Water retaining agent | 0.278 | 0.278 |
| Starch | 0.278 | 0.278 |
| Benaqua 4000 | 0.147 | 0 |
| PPD-T fiber | 0 | 0.1248 |
| Test Results: |  |  |
| Sag | 0.8 mm | 0 mm |
| Flexion | 1.5 mm | 4.873 mm |
| Water immersion | 1.10 Mpa | 1.56 Mpa |

Benaqua 4000 is a clay and is conventionally used to impart sag resistance.

The above test results show significant improvement in the sag resistance, flexibility and water immersion strength versus the clay sag resistance additive.

Formula 2 of the invention shows 225% more flexibility and 42% increase in bond strength when immersed in water. The combination of a stronger bond and more flexibility makes the mortar more durable for exterior wall applications. The increase in sag resistance is also significant.

EXAMPLE 3

Example 3 shows the effect of using a combination of PPD-T fiber and conventional nonsag additive.

|  | Comparative Formula 3A | Formula 3 |
| --- | --- | --- |
| Gray cement | 39 | 39 |
| Sand | 56.27 | 56.27 |
| Water retention agent | 0.75 | 0.75 |
| Polymer | 3.75 | 3.75 |
| Defoamer | 0.046 | 0.046 |
| PPD-T | 0 | 0.112 |
| Benaqua 4000 | 0.037 | 0.037 |
| Test Results: |  |  |
| Initial bond (28 day Mpa) | 1.66 | 1.80 |
| Heat age (Mpa) | 1.10 | 1.15 |
| Water immersion (Mpa) | 1.1 | 1.8 |
| 20 minutes open time (Mpa) | 1.1 | 1.7 |
| Freeze and thaw (Mpa) | 0.84 | 1.4 |
| Flexion | 2.1 mm | 4.8 mm |

The results show an increase in all the above performance properties.

The mortar of the invention is more flexible and provides stronger bonds in all the above tests. This is important especially for exterior facade applications which will be exposed to expansion and contraction and physical and thermal shock as a result of wind, temperature and humidity changes.

EXAMPLE 4

This example shows the synergistic effect of using the KEVLAR pulp with a water retaining agent.

Four of the same mortars were prepared and mixed with water to reach the same consistency. The mortars were slaked 5 minutes and then each applied to a concrete block with a ¼" notched trawl. After 16 minutes, a wall tile (2"×2") was placed on each mortar and a 2 kg weight was placed on the top of the tile for 30 seconds. A metal block (or T bar) was glued on the tile and after 6 minutes the tile was pulled off using an Instron Tensile Strength Tester at 100 pounds load cell and 0.1 "/minute crosshead speed.

Formula 4 has Kevlar pulp and water retaining agent.

Formula 4A has water-retaining agent without Kevlar pulp.

Formula 48 has no Kevlar pulp and water-retaining agent.

Formula 4C has Kevlar pulp, but no water-retaining agent.

Tensile pull test results (on fresh and wet mortar):

Formula 4=0.435 PSI, 95% tile coverage

Formula 4A=0.145 PSI, 50% coverage

Formula 4B=0 PSI, 0% coverage

Formula 4C=0 PSI, 0% coverage

The above results show that the use of both KEVLAR pulp and a water retaining agent increased the bond strength of the mortar by a factor of 3 and that 95% of the tile was covered with the mortar compared to only 50% without KEVLAR. The other tiles exhibited no bond strength or tile coverage. The greater the tile coverage the stronger the bond.

EXAMPLE 5

Comparative mortar compositions employing either glass fiber or cellulose fiber provided poor thin-set mortar performance properties.

A mortar composition containing, by weight %, 47.3 cement, 47.3 sand, 0.47 water retaining agent, 4.7 polymer, 0.075 defoamer and 0.09 glass fiber showed no open time and no transfer onto the tile for fresh and wet mortar.

A mortar composition containing, by weight %, 39.4 cement, 57.74 sand, 0.24 water retaining agent, 0.1 defoamer, 1.1 limestone and 0.69 cellulose fiber showed a high water demand and short open time.

EXAMPLE 6

A comparative mortar composition employing 0.5 inch long nylon monofilament fiber produced poor thin-set mortar performance properties vs. a composition containing KEVLAR pulp. The KEVLAR containing mortar had better workability, 90% transfer onto tile and wet bond strength of 0.58 psi. The nylon containing mortar had only a 10% transfer onto tile and a wet bond strength of 0.29 psi.

EXAMPLE 7

Comparative thin-set mortar compositions were prepared containing 56 parts sand, 39 parts cement, 0.75 parts water retaining agent, 3.75 parts polymer, 27% water and 0.11 2 parts additive and the test results are as indicated below in the Table (Comparative Formula 7A, the standard, contained 25% water.)

TABLE

|  | Formula 7(1) | Formula 7(2) | Formula 7(3) | Comparative Formula 7A | Comparative Formula 7B | Comparative Formula 7C |
|---|---|---|---|---|---|---|
| Additive | Kevlar Pulp | Kevlar Fiber | Nomex Fiber | No Additive | Nylon Fiber [1] | Polypropylene Fiber [2] |
| Test Results |  |  |  |  |  |  |
| Sag (mm) | 0.63 | 0.63 | 0.63 | 0.76 | 0.63 | 0.63 |
| Heat resistance | 0.912 | 0.803 | 1.02 | 0.794 | 0.763 | 0.664 |
| 20 min. open time | 1.05 | 0.889 | 0.879 | 0.675 | 1.071 | 0.942 |
| Initial bond | 0.917 | 1.152 | 0.926 | 0.808 | 0.961 | 0.692 |

[1] Nylon fiber - 6 mm length and 0.0064 mm thickness
[2] Polypropylene fiber - 3 mm length The comparative test results show the improvement in overall properties when using the additive fibers of the invention. Formula 7(1) using Kevlar pulp has the best overall performance properties with Formula 7 (2) using Kevlar fiber and Formula 7 (3) using Nomex fiber showing significant improvements over the Comparative Formula 7A which did not contain an additive. Comparative Formula 7B using a nylon fiber additive had poor heat resistance and Comparative Formula 7C using a polypropylene fiber had both poor heat resistance and initial bond strength.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A cement-based thin set mortar or medium bed mortar for installing tile, stone and other masonry products over concrete, masonry, brick and plywood substrates by troweling the composition on the substrate in a thickness up to about ¾ inch and placing the masonry product on the trowelled composition, the composition having enhanced overall performance properties including sag resistance, high tensile bond and shear bond strength, long open time, flexibility, water immersion strength, heat aging and freeze and thaw resistance comprising:

cement;

a filler;

a water retaining agent; and an effective amount of a fiber selected from the group consisting of poly(p-phenylene terephthalamide) polymer fiber and a poly(m-phenylene terephthalamide) polymer fiber in the mortar to improve the overall performance properties of the mortar.

2. The mortar of claim 1 wherein the polymer is poly(m-phenylene terephthalamide).

3. The mortar of claim 2 wherein the polymer is in the form of cut fibers.

4. The mortar of claim 2 wherein the polymer is in the form of a fibrillated polymer.

5. The mortar of claim 4 wherein the cement is a hydraulic cement and the filler is sand.

6. The mortar of claim 5 wherein the water retaining agent is an alkyl derivative of cellulose.

7. The mortar of claim 1 which is admixed with a liquid media to form a plastic and trowable wet mortar.

8. The mortar of claim 7 wherein the liquid media is water.

9. The mortar of claim 7 wherein the liquid media is latex.

10. A cement-based grout for filling in spaces between set tiles having enhanced sag resistance and reduced void spaces comprising:

cement;

a filler;

a water retaining agent;

cement accelerator;

defoamer; and an effective amount of a fiber selected from the group consisting of poly(p-phenylene terephthalamide) polymer fiber and poly(m-phenylene terephthalamide) polymer fiber in the grout to improve the overall performance properties of the grout.

11. The grout of claim 10 wherein the polymer is poly(m-phenylene terephthalamide).

12. The grout of claim 11 wherein the polymer is in the form of cut fibers.

13. The grout of claim 11 wherein the polymer is in the form of a fibrillated polymer.

14. The grout of claim 13 wherein the cement is a hydraulic cement and the filler is sand.

15. The grout of claim 14 wherein the water retaining agent is an alkyl derivative of cellulose.

16. The grout of claim 10 which is admixed with a liquid media to form a plastic and trowable grout.

17. The grout of claim 16 wherein the liquid media is water.

18. The grout of claim 17 wherein the liquid media is latex.

19. A cement-based underlayment mortar for preparing uneven substrates to receive tile installed using a thin-set or medium-set mortar the underlayment mortar having enhanced flexural resistance, workability and reduced slumping or shrinkage comprising:

cement;

an accelerator;

a filler;

a defoamer;

a retarder; and an effective amount of a fiber selected from the group consisting of poly(p-phenylene terephthalamide) polymer fiber and poly(m-phenylene terephthalamide) polymer fiber in the underlayment to improve the overall performance properties of the underlayment.

20. The underlayment of claim 19 wherein the polymer is poly(m-phenylene terephthalamide).

21. The underlayment of claim 20 wherein the polymer is in the form of cut fibers.

22. The underlayment of claim 20 wherein the polymer is in the form of a fibrillated polymer.

23. The underlayment of claim 22 wherein the cement is a hydraulic cement and the filler is sand.

24. The underlayment of claim 23 wherein the water retaining agent is an alkyl derivative of cellulose.

25. The underlayment of claim 19 which is admixed with a liquid media to form a plastic and trowable underlayment.

26. The underlayment of claim 25 wherein the liquid media is water.

27. The underlayment of claim 26 wherein the liquid media is latex.

28. A method for setting tiles comprising the steps of:

supplying a thin-set mortar or medium bed mortar composition having enhanced sag resistance, high tensile and shear bond strength, long open time, flexibility, water immersion strength, heat aging and freeze and thaw resistance comprising:

cement;

a filler;

a water retaining agent; and an effective amount of a fiber selected from the group consisting of poly(p-phenylene terephthalamide) polymer fiber and a poly(m-phenylene terephthalamide) polymer fiber in the mortar to improve the overall performance properties of the mortar;

adding a liquid and forming a plastic and trowable wet mortar;

forming a layer of the wet mortar in a thickness up to about ¾ inch on a substrate to be tiled;

placing tiles on the layer of wet mortar in the desired configuration; and curing the mortar to set the tile.

29. The method of claim 28 wherein the polymer fiber is poly(p-phenylene terephthalamide).

30. A method for setting tiles comprising the steps of:

supplying a grout having enhanced sag resistance and reduced void spaces comprising:

cement;

a water retaining agent;

cement accelerator;

defoamer; and an effective amount of a fiber selected from the group consisting of poly(p-phenylene terephthalamide) polymer fiber and a poly(m-phenylene terephthalamide) polymer fiber in the grout to improve the overall performance properties of the grout;

adding a liquid and forming a plastic and trowable grout;

forming a grout joint in the spaces between tiles which have been set in the desired configuration; and curing the grout.

31. The method of claim 30 wherein the polymer fiber is poly(p-phenylene terephthalamide).

32. A method for applying an underlayment mortar to a substrate to provide an even surface for the setting of tiles comprising the steps of:

supplying an underlayment mortar having enhanced flexural resistance, workability and reduced slumping or shrinkage comprising:

cement;
an accelerator;
a filler;
a defoamer;
a retarder; and
an effective amount of a fiber selected from the group consisting of 12 poly(p-phenylene terephthalamide) polymer fiber and a poly(m-phenylene terephthalamide) polymer fiber in the underlayment mortar to improve the overall performance properties of the underlayment mortar;

adding a liquid and forming a plastic and trowable wet underlayment mortar;

distributing the underlayment mortar on the substrate to form an even surface; and setting tiles in a thin-set or medium-set mortar composition on the underlayment mortar surface.

33. The method of claim 32 wherein the polymer fiber is poly(p-phenylene terephthalamide).

* * * * *